United States Patent [19]

Kawauchi

[11] Patent Number: 5,619,653

[45] Date of Patent: Apr. 8, 1997

[54] BUFFER DEVICE WITH RESENDER

[75] Inventor: Yoshikazu Kawauchi, Tokyo, Japan

[73] Assignee: NEC Corporation, Tokyo, Japan

[21] Appl. No.: 676,101

[22] Filed: Jul. 2, 1996

Related U.S. Application Data

[63] Continuation of Ser. No. 115,526, Sep. 1, 1993, abandoned.

[30] Foreign Application Priority Data

Sep. 4, 1992 [JP] Japan ..................................... 4-236702

[51] Int. Cl.[6] ................................................. G06F 13/12
[52] U.S. Cl. .................... 395/200.08; 395/250; 395/872; 395/200.14; 395/200.13
[58] Field of Search ................................... 395/250, 872, 395/200.14, 200.13, 200.06

[56] References Cited

U.S. PATENT DOCUMENTS

| | | | |
|---|---|---|---|
| 4,535,427 | 8/1985 | Jiang | 365/205 |
| 4,829,524 | 5/1989 | Yoshida | 371/32 |
| 4,935,894 | 8/1987 | Ternes et al. | 364/900 |
| 4,939,720 | 7/1990 | Bakka | 370/60 |
| 5,155,810 | 10/1992 | McNamara, Jr. et al. | 395/250 |
| 5,283,763 | 2/1994 | Pham et al. | 365/221 |

*Primary Examiner*—Larry D. Donaghue
*Attorney, Agent, or Firm*—Whitham, Curtis, Whitham, & McGinn

[57] ABSTRACT

A buffer device with a resending function includes data holders each for storing one unit of data, write attribute flags provided for each one of the data holder for indicating whether data is stored within the corresponding data holders, a write data bus connected to the data holders to transmit data from a transmission side, a read data bus connected to the data holders to transmit data to a reception side, a write pointer that designates a write sequence of data when storing data to any of the data holders, a read pointer that designates a read sequence of data when taking data from any of the data holders, and a controller that controls transmission of data to the reception side based on the input of a restart signal and an abandon signal. The write attribute flags which correspond to the data holders from which data has been read are not cleared if the abandon signal is inactive. When the restart signal becomes active, the value of the read pointer is altered to the value corresponding to the starting data holder, and the data stored in the buffer devices is resent to the reception side.

15 Claims, 4 Drawing Sheets

BUFFER DEVICE WITH RESENDER

This is a Continuation of application Ser. No. 08/115,526 filed Sep. 1, 1993, now abandoned.

BACKGROUND OF THE INVENTION

1. Field of the Invention

The present invention relates to a buffer device used when transmitting data.

2. Description of the Related Art

When transmitting data from a system on a transmitting side to a system on a receiving side, there are cases when buffers are provided between the two systems and cases when they are not. FIG. 1 illustrates a case in which data is transmitted without the use of a buffer.

In FIG. 1, a transmission-side data bus 401 and a reception-side data bus 402 are directly connected, and in addition to these data buses, there is provided a signal line 403 from the reception side to the transmission side. The signal line 403 is provided for the purpose of transferring to the transmission side a reception-ready signal indicated that the reception side is in a state capable of reception. The transmission side then checks the reception-ready signal and sends the data to the reception side. If the transmission side is unable to confirm the signal, it suspends transmission until it receives the signal. This type of control is performed because transmitted data is lost when the reception side is not in a reception-ready state. In this method, the transmission side and reception side are directly connected and secure transmission of data can therefore be performed. However, when the two sides differ greatly in transmission speed, waiting time will be generated on the side capable of faster transmission and transmission efficiency is poor.

Here, an improvement in transmission efficiency can be sought by providing a First-In First-Out (FIFO) buffer between the transmission side and reception side. FIG. 2 is a block diagram illustrating a conventional data transmission device using an FIFO buffer.

In FIG. 2, an FIFO device 301 is provided between the data bus 302 of the transmission-side terminal and the data bus 304 of the reception-side terminal. The transmission side apparatus is connected in order to transmit data to the FIFO device 301, and the FIFO device 301 is connected in order to transmit data to the reception side apparatus.

Inside the FIFO device 301 are provided a number n of buffers $b_1, b_2, \ldots, b_n$ in a series. The first buffer $b_1$ is directly connected to the transmission side, and the $n^{th}$ buffer $b_n$ is directly connected to the reception side. The second buffer $b_2$ is the next buffer after buffer $b_1$. Each of the buffers $b_1$ to $b_n$ is composed of write attribute bits $w_1$ to $w_n$ and data holders $d_1$ to $d_n$ that actually hold data. Write attribute bits $w_1$ to $w_n$ are flags that indicate the presence or absence of data in the corresponding data holders $d_1$ to $d_n$, "0" indicating an absence of data and "1" indicating that data is being held. The first buffer $b_1$ transmits data to the second buffer $b_2$, and the following buffers proceed similarly, the $m^{th}$ buffer $b_m$ transmitting data to the $[m+1]^{th}$ buffer $b_{m+1}$. A signal line 306 is provided for the purpose of inputting from the reception side to the FIFO device 301 a reception-ready signal, and another signal line 305 is provided for providing from the FIFO device 301 to the transmission side a reception-ready signal for the FIFO device 301 itself. In addition, there is provided in the FIFO device a reset signal line 303 for the purpose of forcibly setting all of the write attribute bits $w_1$ to $w_n$ to "0."

The transmission side, after receiving the reception-ready signal from the FIFO device 301, confirms that the first buffer $b_1$ within the FIFO device 301 is empty, and then transmits data to the FIFO device 301. At this time, as a flag indicating that data is present, "1" is entered to the write attribute bit $w_1$ corresponding to the data holder $d_1$ into which data has been transmitted.

Within the FIFO device 301, if the second buffer $b_2$ is empty, data is moved to the second buffer $b_2$ and the first buffer $b_1$ becomes empty. At this time, as a flag indicating that data is absent, "0" is entered to the write attribute bit $w_1$ of the sending source buffer $b_1$. By the same process, this operation is repeated until the $n^{th}$ buffer $b_n$. The presence or absence of data within each buffer $b_1$ to $b_n$ is checked by means of the write attribute bits $w_1$ to $w_n$. The $n^{th}$ buffer $b_n$ confirms that the reception side is in a reception-ready state. When a reception-ready signal is received from signal line 306, data is transmitted to the reception side.

When this type of FIFO device 301 is interposed between a transmission side and a reception side, data can be transmitted by the same operations as viewed by the either the transmission side or the reception side as in the previously-described case in which a buffer is not used. Furthermore, if an FIFO device having high-speed and sufficient data capacity is used, the transmission side considers itself connected with a high-speed reception terminal while the reception side takes in data according to its own reception speed, and as a result, waiting time can be reduced without such problems as loss of data, and a real increase in transmission efficiency can be achieved.

However, if this type of FIFO device is applied in a circuit that can be disconnected from the reception side during data transmission, data transmission efficiency may suffer due to data resending that accompanies circuit disconnection. As an example of the sort of circuit that can be disconnected from the reception side, there is a packet circuit that uses a D-channel at the S-interface of an ISDN (Integrated Services Digital Network). When resending data, because the meaning carried by the data will change according to its sequence of transmission, the data must be transmitted again beginning from its start. The data that has already been transmitted to the FIFO device must therefore be completely erased by means of a reset signal and all of the data must be sent again by way of the FIFO device. Ultimately, if data resending is carried out, all of the data must again be transmitted as in a case in which a buffer is not provided, and as a result, the amount of outgoing data increases, the transmission efficiency drops, and the advantages of using an FIFO device are lost.

SUMMARY OF THE INVENTION

The object of the present invention is to provide a buffer device that increases data transmission efficiency even in cases in which resending must be carried out.

The object of the present invention is achieved by means of a buffer device that is provided between the transmission side and the reception side; that is used at the time of data transmission; and that has a plurality of data holding means that store each unit of data; write attribute flags for each unit of the data holding means that indicate whether or not data is stored; a write data bus provided in common with the plurality of data holding means that inputs data from the transmission side; a read data bus provided in common with the plurality of data holding means that transmits data to the reception side; write pointer means that designates the write sequence of the data when data from the write data bus is stored to any unit of the data holding means; data read pointer means that designates the read sequence of the data when data is taken from the data holding means to the read data bus; and control means that inputs a reset signal, a restart signal, a reception-ready signal, and an abandon instruction signal, and controls the outflow of data to the reception side based on each of these signals.

The above and other objects, features and advantages of the present invention will be apparent from the following description referring to the accompanying drawings which illustrate an example of preferred embodiments of the present invention.

DETAILED DESCRIPTION OF THE PREFERRED EMBODIMENTS

Figure 1:
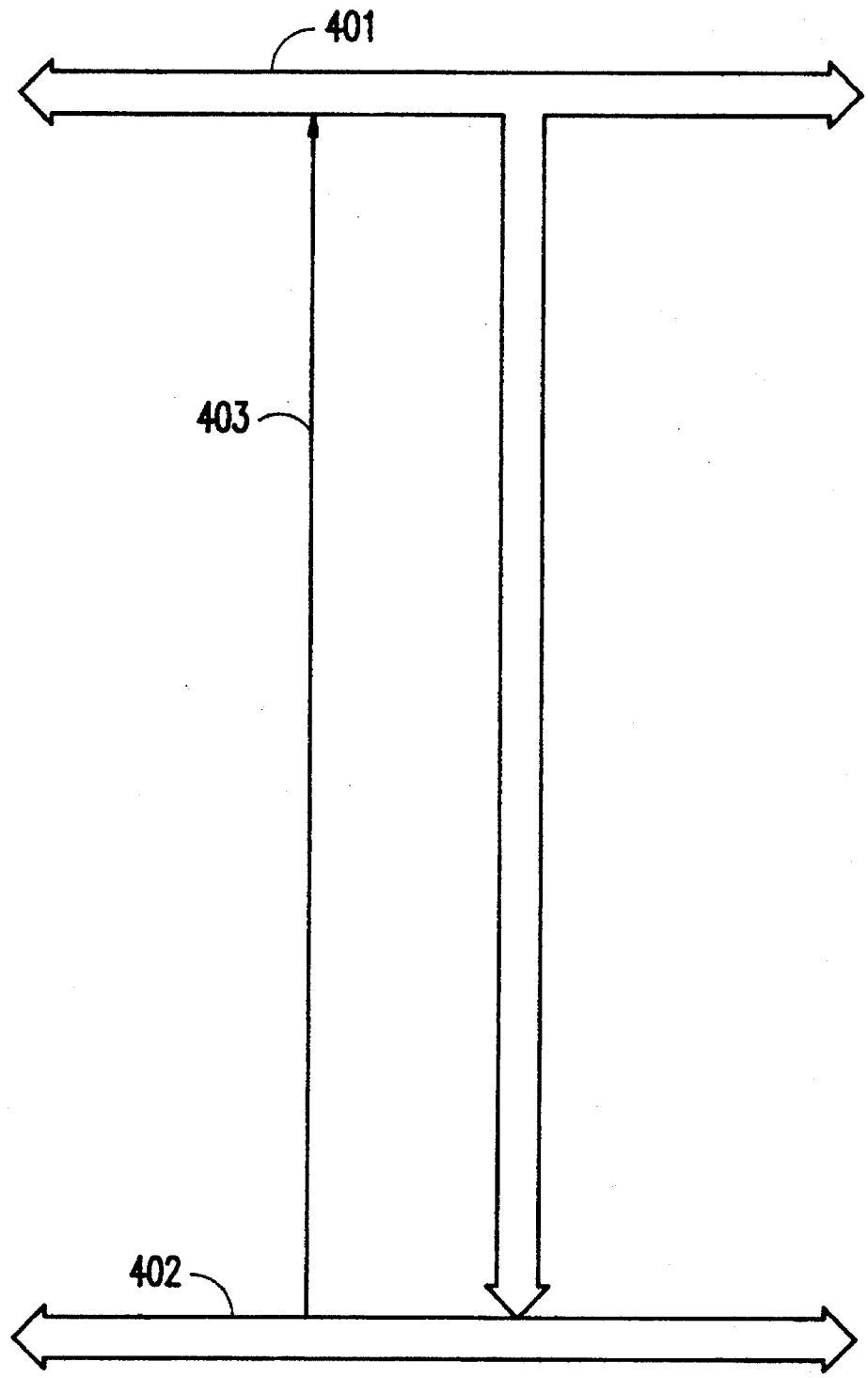
FIG. 1 is a diagram illustrating a transmission method in which a buffer is not used.
Figure 2:
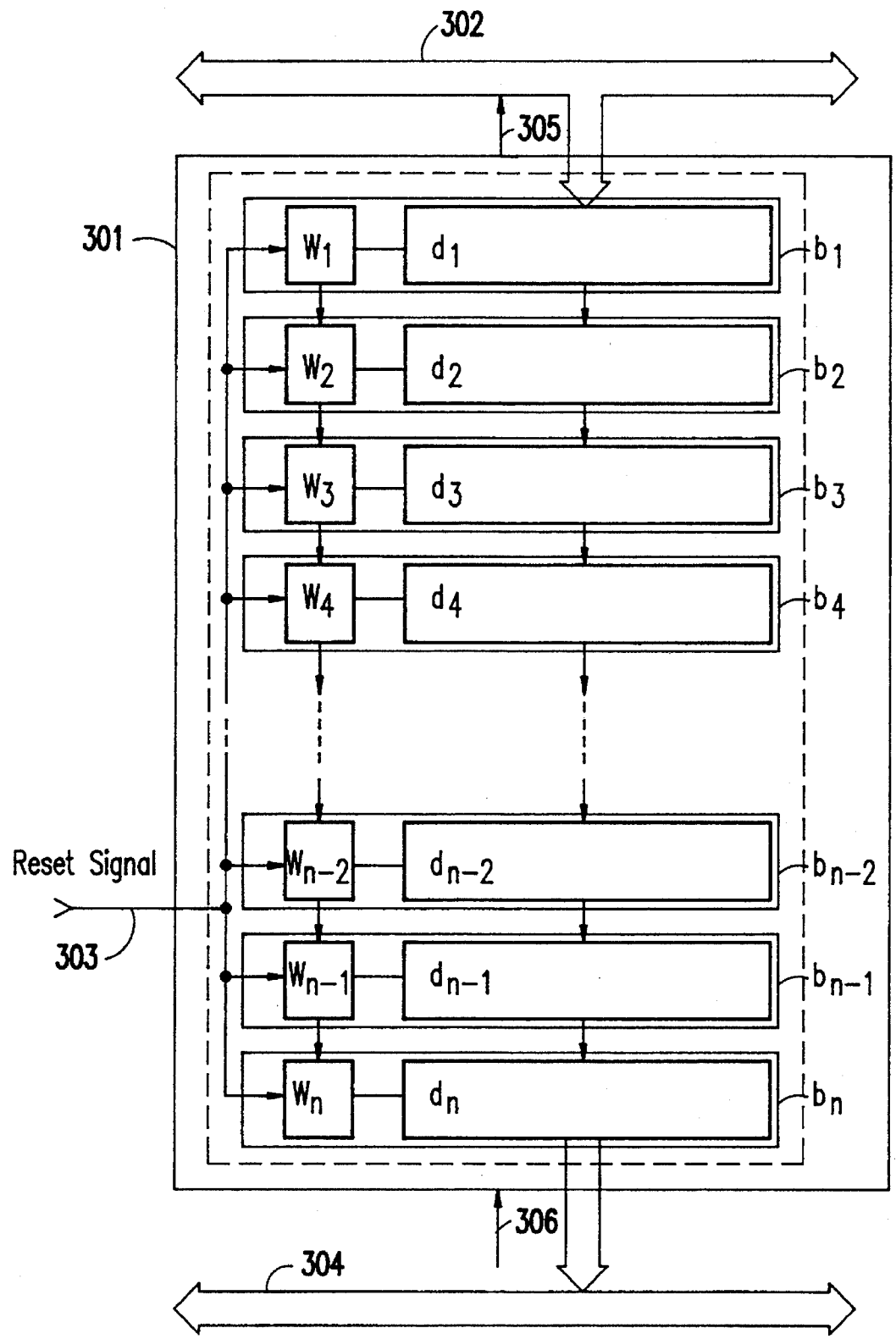
FIG. 2 is a block diagram illustrating a data transmission device of the prior art that uses an FIFO buffer.
Figure 3:
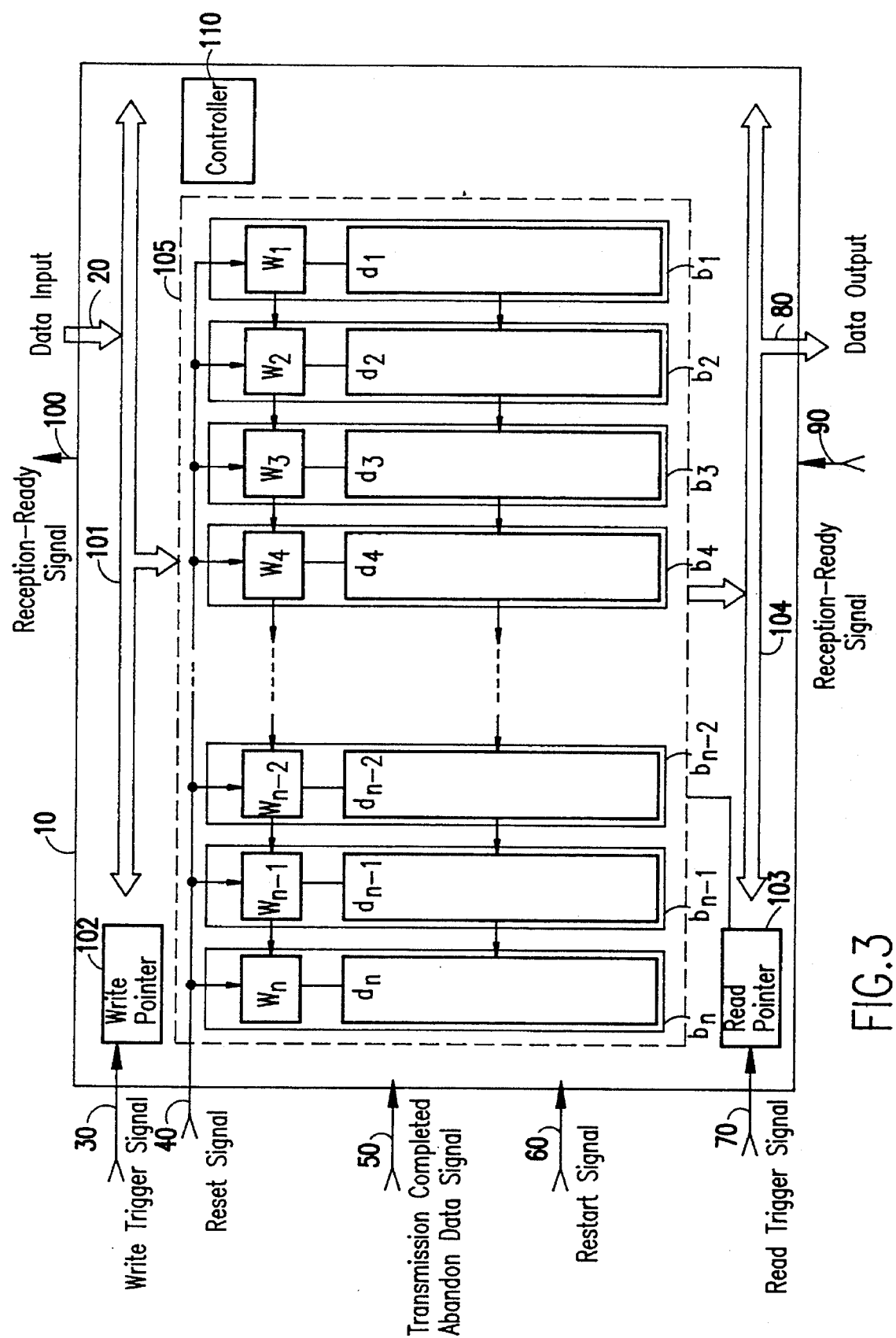
FIG. 3 is a block diagram showing the composition of a first embodiment of the buffer device of the present invention.

Preferable embodiments of the present invention will next be explained with reference to the accompanying drawings. The buffer device 10 of the first embodiment shown in FIG. 3 is connected between data bus 20 of the transmission-side terminal and data bus 80 of the reception-side terminal. The inside of the buffer device 10 is composed of an internal write data bus 101 connected to the transmission-side data bus 20, a write pointer 102, a read pointer 103, an internal read data bus 104 connected to the reception-side data bus 80, a storage assembly 105 made up of a number n of buffers $b_1$ to $b_n$, and a controller 110 provided for controlling the operation of this buffer device 10. Each of the buffers $b_1$ to $b_n$ is composed of a write attribute bit $w_1$ to $w_n$ and a data holder $d_1$ to $d_n$ that actually holds the data. The write attribute bits $w_1$ to $w_n$ are flags that indicate the absence or presence of data in the corresponding data holders $d_1$ to $d_n$, a "0" flag indicating that data is absent and a "1" flag indicating that data is present. Also provided are a signal line 30 for inputting a write trigger signal, a signal line 40 for inputting a reset signal, a signal line 50 for inputting a "transmission completed abandon data" signal, a signal line 60 for inputting a restart signal, a signal line 70 for inputting a read trigger signal, a signal line 90 for inputting a reception-ready signal from the reception-side terminal, and a signal line 100 for sending to the transmission side a reception-ready signal of the buffer device 10 itself.

The write trigger signal directs that data be written to a buffer. The reset signal is for the purpose of clearing all buffers $b_1$ to $b_n$ within the storage assembly 105. In actuality, inputting the reset signal causes all write attribute bits $w_1$ to $w_n$ to change to "0." The transmission completed abandon data signal directs that of the data stored in this buffer device 10, data already transmitted to the reception side be abandoned. The restart signal directs that the data stored in this buffer device 10 be transmitted to the reception side from the start regardless of whether transmission is completed or not. The read trigger signal directs that data be read from the buffer.

All of the buffers $b_1$ to $b_n$ are connected to the internal write data bus 101 and are arranged such that data in the internal write data bus 101 is written to a buffer designated by the write pointer 102. In addition, all of the buffers $b_1$ to $b_n$ are also connected to the internal read data bus 104 and are arranged such that data within a buffer designated by the read pointer 103 is read to the internal read data bus 104. The write pointer 102, in accordance with the write trigger signal from signal line 30, designates the buffer into which data should be written and operates such that after one buffer is written to, it moves to the next. The read pointer 103, in accordance with a read trigger signal from signal line 70, designates the buffer from which data is to be read and operates such that when one buffer has been read from, it moves to the next.

In the buffer device of the present embodiment, all of the buffers $b_1$ to $b_n$ are connected in a series in order to allow movement of data among the buffers similar to a conventional FIFO device. This movement of data among the buffers, as will later be explained, is carried out after a circuit to which this buffer device is to be applied has been established, i.e., when there is almost no possibility of an unexpected circuit disconnection.

The operation of the buffer device 10 of the present embodiment will next be explained. For this explanation, an example will be given in which the buffer device 10 is used to transmit data from the transmission side to a D-channel of an S-interface of an ISDN. Because it is a D-channel, communication is carried out in a packet mode. Furthermore, on a D-channel, a plurality of transmission terminals can be connected to the same channel, and there are cases in which these transmission terminals transmit to the same channel. In this case, only one of these transmission terminals is actually able to continue data transmission, and the circuits of the other transmission terminals that cannot compete are disconnected a period of time following the start of transmission of data.

The operation at the time data is sent from the transmission side to this buffer device 10 will first be explained. In the initial state, all of the buffers $b_1$ to $b_n$ are empty, and both the write pointer 102 and the read pointer 103 designate the first buffer $b_1$.

In the beginning, the transmission completed abandon data signal and the restart signal on signal lines 50, 60 are made inactive. When a reception ready signal is transmitted to the transmission side by means of signal line 100, the transmission side transmits data to the buffer device 10. The data passes through the internal write data bus 101 and is written to data holder $d_1$ in the first buffer $b_1$, and at the same time, "1" is written to write attribute bit $w_1$ as a mark that data writing is completed. The write pointer 102 then moves to the next buffer. Data is written sequentially into each buffer $b_2$ to $b_n$ in the same way. However, the write operation is not carried out for a buffer if "1" has already been written to the write attribute bit of that buffer.

Assuming that the reception side is in a reception-ready state, when the reception-ready state is detected by means of the reception-ready signal from signal line 90, data is read from the buffer indicated by the read pointer 103 and sent from the buffer device 10 to the reception side by means of the internal read data bus 104. The read pointer 103 then moves to the next buffer.

The difference between the buffer device 10 of the present embodiment and a buffer device of the prior art or an FIFO device is that as long as the transmission completed abandon data signal from signal line 50 is not active, the write attribute bits $w_1$ to $w_n$ are not cleared. In other words, the data is maintained because the write attribute bits $w_1$ to $w_n$ continue to indicate that data is present in the buffers $b_1$ to $b_n$ even after data has been transmitted to the reception side. If the transmission completed abandon data signal is active at this point, the write attribute bits of the relevant buffers are cleared at the same time data is transmitted to the reception side, meaning that the data is erased after transmission just as in the buffer device of the prior art. In addition, when the transmission completed abandon data signal becomes active, according to direction from the controller 110, the write attribute bits for data that has been read are cleared progressing back from the write attribute bit of the buffer presently designated by the read pointer 103.

On the other hand, if the restart signal has been inputted by means of signal line 60, the write attribute bits are detected in reverse order and changed such that the value of the read pointer 103 indicates the data head (the first buffer $b_1$).

In the present embodiment, the transmission completed abandon data signal is sent from the reception side, and the reception side does not send the transmission completed abandon data signal until the circuit is absolutely established. After the establishment of the circuit is confirmed, the transmission completed abandon data signal is sent from the reception side to the buffer device 10. Due to the reception of the transmission completed abandon data signal by the buffer device 10, the write attribute bits of buffers at and before the buffer designated by the read pointer 103 are cleared, thereby abandoning the data that has been transmitted. From this point on, the operation is the same as in the previously-described FIFO of the prior art.

In a case in which the circuit has been disconnected and data transmission ends in failure, the failure of data transmission is detected and a restart signal is inputted to the buffer device 10. In this way, as long as the amount of data from the transmission side does not exceed the capacity of the buffers when the reception side disconnects the circuit, data resending is carried out from the start of the transmitted data that remains in the buffer device 10. In this way, in cases when data resending must be performed, there is no need to reset the buffer device 10 and again transmit to the buffer device 10 data that has already been transmitted once before. There is consequently no need to take into consideration unexpectedly generated resending requests. Data that has once been transmitted does not have to be resent from the transmission side, and data transmission can therefore be carried out efficiently.

Figure 4:
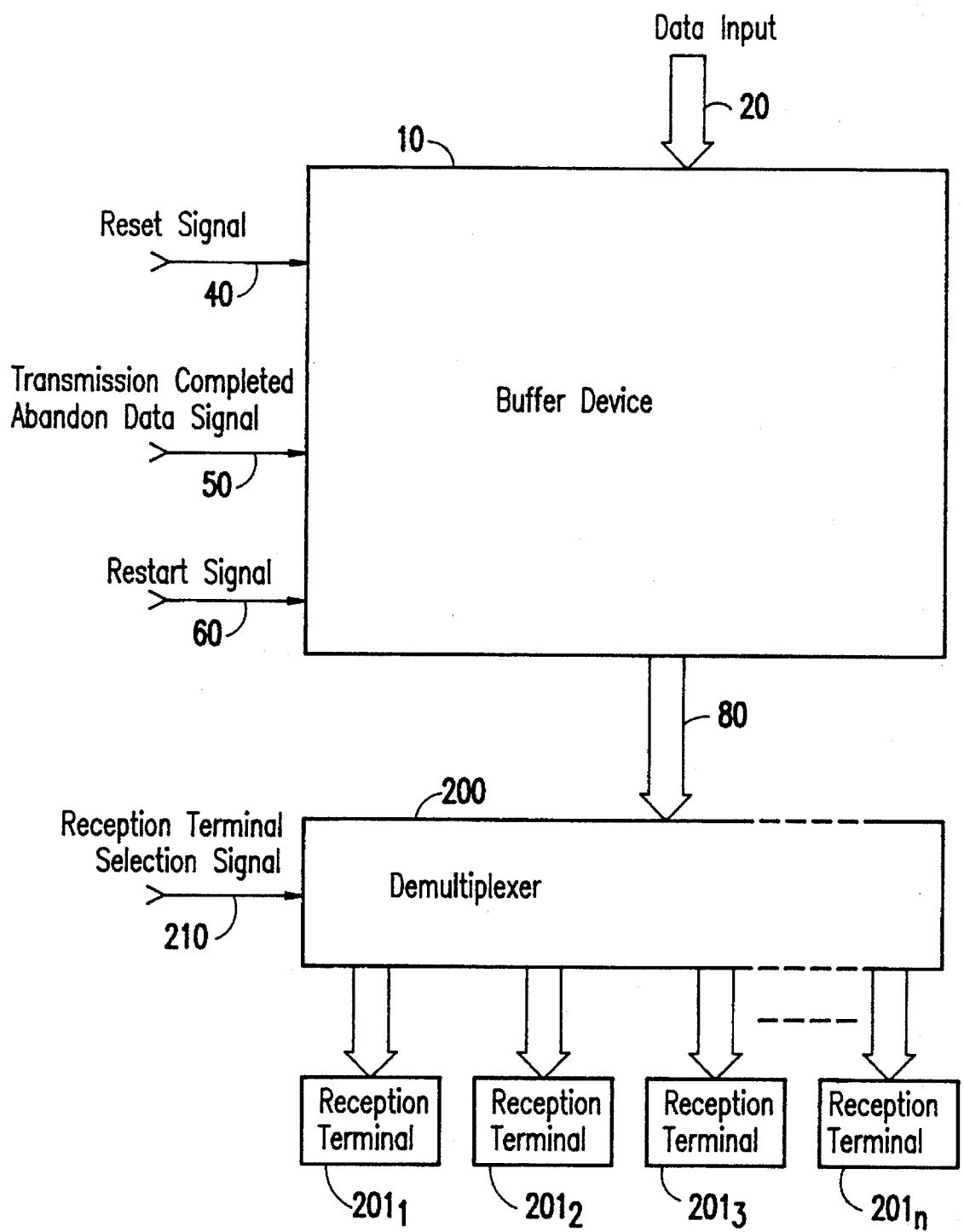
FIG. 4 is a block diagram showing the composition of the multi-address calling device of the second embodiment of the present invention.

The second embodiment of the present invention will next be explained with reference to FIG. 4. The device of this embodiment is a multi-address calling device using the buffer device 10 of the first embodiment. This multi-address calling device transmits the same data to a plurality of reception terminals. Furthermore, components in FIGS. 3 and 4 that are identified with the same reference numerals are the same.

A demultiplexer 200 is provided on the output side of the buffer device 10, and data from the buffer device 10 is sent to a plurality of reception terminals $201_1$ to $201_n$. A reception terminal selection signal for the purpose of designating reception terminals to which data should be sent is sent to the demultiplexer 200 by way of signal line 210. The composition of the demultiplexer is as for multi-address calling devices of the prior art.

When data is sent from the transmission side to the buffer device 10, the data is sent to each of the reception terminals $201_1$ to $201_n$. At this time, the transmission completed abandon data signal is not sent to the buffer device 10 until all data transmission has been completed.

First, the demultiplexer 200 is set to one reception terminal by means of the reception terminal selection signal and all data is transmitted. Here, since the transmission completed abandon data signal is not active, all data is stored within the buffer device 10. Next, the same data is transmitted to a different reception terminal. At this time, the demultiplexer 200 is switched to that reception terminal by means of the reception terminal selection signal, and the restart signal is sent to the buffer device 10. By repeating this process, the transmission side can send the same data to a large number of reception terminals by simply sending a control signal (restart signal) to the buffer device 10 for each of the reception terminals from the second reception terminal on, assuming that the amount of data is less than the buffer capacity or that the data can be divided to a smaller size than the buffer capacity. If a buffer is not used and the number of reception terminals is "n," the amount of time required for transmission on the transmission side is n times the time required for transmitting to one reception terminal, but in the present embodiment, the time required for transmission on the transmission side is nearly constant regardless of the number of reception terminals, resulting in a remarkable improvement in data transmission efficiency.

Further explanation will be given regarding applications of the present invention. The buffer device of the present invention can also be applied to communication by HDLC (High-level Data Link Control Procedure) packets. If the amount of data in a packet is smaller than the capacity of the buffer device, the buffer device can continue to hold data even after the buffer device has transmitted data to the reception side, and if no error is found in the data check by the reception side of the transmitted data, the data in the buffer is abandoned and the next data transmission performed, and if an error is found, data can be resent from the buffer device. In this way, for packets smaller than the capacity of the buffer, data can be transmitted error-free as seen from the transmission side.

It is to be understood that variations and modifications of the buffer device disclosed herein will be evident to those skilled in the art. It is intended that all such modifications and variations be included within the scope of the appended claims.

What is claimed is:

1. A buffer device, having a transmission side and a reception side, for transmitting data, comprising:

a plurality of data holding means each for storing one unit of data;

write attribute flags provided for each of said data holding means for indicating if data is stored within a corresponding data holding means of said plurality of data holding means;

a write data bus operatively connected to said plurality of data holding means for receiving data from said transmission side;

a read data bus operatively connected to said plurality of data holding means for transmitting data to said reception side;

write pointer means for designating a write sequence of data when storing data from said write data bus to said plurality of data holding means;

read pointer means for designating a read sequence of data when transmitting data from said plurality of data holding means to said read data bus; and control means for controlling transmission of data to said reception side based on an input of a restart signal and an abandon signal, wherein said control means:

refers to said abandon signal and said restart signal;

preserves a status of said write attribute flags corresponding to data holding means from which data has been read if said abandon signal is inactive and clears said write attribute flags corresponding to data holding means from which data has been read if said abandon signal is active.

2. The buffer device according to claim 1, wherein said write pointer means refers to said write attribute flags and identifies an empty data holding means of said plurality of data holding means in which data is not stored and, when data is written to said empty data holding means, the write attribute flag corresponding to said empty data holding means is set to a first condition.

3. The buffer device according to claim 1, wherein said control means:

when said abandon signal shifts to an active state, reads the value indicated by said read pointer means and clears said write attribute flags relative to said value; and when said restart signal becomes active, alters the value of said read pointer means to the value corresponding to data holding means from which data has been read.

4. The buffer device according to claim 1, wherein said abandon signal is inputted from said reception side after an establishment of a circuit is confirmed.

5. The buffer device according to claim 1, wherein said write pointer means and said read pointer means each indicate a data holding means of said plurality of data holding means according to previous data transfer.

6. The buffer device according to claim 1, further comprising demultiplexer means for accommodating a plurality of reception terminals connected to said read data bus, said reception side for receiving a plurality of reception terminal selection signals from an external source, and said demultiplexer means selecting at least one reception terminal of said plurality of reception terminals according to said reception terminal selection signals.

7. The buffer device according to claim 6, wherein, when data is transmitted from said demultiplexer means to said plurality of reception terminals, said demultiplexer means selects and outputs data to the plurality of reception terminals using said reception terminal selection signals and operations of selecting and outputting data being repeated in response to said restart signal until data has been transmitted to said plurality of reception terminals.

8. A buffer device, having a transmission side and a reception side, for transmitting data, comprising:

a plurality of data holding means each for storing one unit of data;

write attribute flags provided for each of said data holding means for indicating if data is stored within a corresponding data holding means of said plurality of data holding means;

a write data bus operatively connected to said plurality of data holding means for receiving data from said transmission side;

a read data bus operatively connected to said plurality of data holding means for transmitting data to said reception side;

write pointer means for designating a write sequence of data when storing data from said write data bus to said plurality of data holding means;

read pointer means for designating a read sequence of data when transmitting data from said data holding means to said read data bus; and control means for controlling transmission of data to said reception side, wherein said reception side receives an abandon signal and a restart signal from an external source, said control means:

referring to said abandon signal and said restart signal;

preserving a status of said write attribute flags corresponding to data holding means from which data has been read if said abandon signal is inactive; and clearing said write attribute flags corresponding to data holding means from which data has been read if said abandon signal is active, said control means, when said abandon signal shifts to an active state, reading a value indicated by said read pointer means and clearing said write attribute flags relative to said value, and said control means, when said restart signal becomes active, altering the value of said read pointer means to the value corresponding to data holding means from which data has been read.

9. The buffer device according to claim 8, wherein said write pointer means refers to said write attribute flags and identifies an empty data holding means of said plurality of data holding means in which data is not stored and, when data is written to said empty data holding means, the write attribute flag corresponding to said empty data holding means is set to a first condition.

10. The buffer device according to claim 9, wherein said abandon signal is input from said reception side after an establishment of a circuit is confirmed.

11. The buffer device according to claim 9, wherein said write pointer means and said read pointer means each indicate a data holding means of said plurality of data holding means according to previous data transfers.

12. The buffer device according to claim 9, further comprising demultiplexer means, for accommodating a plurality of reception terminals, connected to said read data bus, said reception side for receiving a plurality of reception terminal selection signals from an external source, and said demultiplexer means selecting at least one reception terminal of said plurality of reception terminals according to said reception terminal selection signals.

13. The buffer device according to claim 12, wherein when data is transmitted from said demultiplexer means to said plurality of reception terminals by way of said read data bus, said demultiplexer means selects and outputs data to the plurality of reception terminals using said reception terminal selection signals and operations of selecting and outputting data being repeated in response to said restart signal until data has been transmitted to said plurality of reception terminals.

14. The buffer device according to claim 1, wherein said data is retransmitted by coordination of said control means, said write pointer means and said write attribute flags.

15. The buffer device according to claim 8, wherein said data is retransmitted by coordination of said control means, said write pointer means and said write attribute flags.

* * * * *